(12) United States Patent
Repond et al.

(10) Patent No.: US 12,708,870 B2
(45) Date of Patent: Aug. 18, 2026

(54) ATMOSPHERIC STEAM DESORPTION FOR DIRECT AIR CAPTURE

(71) Applicant: CLIMEWORKS AG, Zurich (CH)

(72) Inventors: Nicolas Repond, Zürich (CH); Benjamin Megerle, Zürich (CH)

(73) Assignee: CLIMEWORKS AG, Zurich (CH)

( * ) Notice: Subject to any disclaimer, the term of this patent is extended or adjusted under 35 U.S.C. 154(b) by 855 days.

(21) Appl. No.: 17/927,603

(22) PCT Filed: May 25, 2021

(86) PCT No.: PCT/EP2021/063940
§ 371 (c)(1),
(2) Date: Nov. 23, 2022

(87) PCT Pub. No.: WO2021/239748
PCT Pub. Date: Dec. 2, 2021

(65) Prior Publication Data

US 2023/0173427 A1 Jun. 8, 2023

(30) Foreign Application Priority Data

May 27, 2020 (EP) .................................... 20176844

(51) Int. Cl.
*B01D 53/04* (2006.01)
*B01D 53/02* (2006.01)
(Continued)

(52) U.S. Cl.
CPC ......... *B01D 53/0462* (2013.01); *B01D 53/02* (2013.01); *B01D 53/0454* (2013.01);
(Continued)

(58) Field of Classification Search
None
See application file for complete search history.

(56) References Cited

U.S. PATENT DOCUMENTS 7,288,136 B1 10/2007 Gray et al.
8,491,705 B2 7/2013 Choi et al.
(Continued)

FOREIGN PATENT DOCUMENTS

CN 207591581 U * 7/2018
EP 2 089 139 B1 10/2013
(Continued)

OTHER PUBLICATIONS

CN207591581U_ENG (Expacenet machine translation of Zhou) (Year: 2018).*
(Continued)

*Primary Examiner* — Gabriel E Gitman
(74) *Attorney, Agent, or Firm* — Sughrue Mion, PLLC

(57) ABSTRACT

A method for separating gaseous carbon dioxide from a gas mixture having the following steps: (a) contacting the gas mixture with sorbent material to allow gaseous carbon dioxide to adsorb under ambient conditions, using a speed of the adsorption gas flow; (b0) isolating the sorbent with adsorbed carbon dioxide from said flow-through of gas mixture; (b1) injecting a stream of saturated steam at ambient conditions and inducing an increase of the temperature of the sorbent to a temperature between 60 and 110° C., (b2,b3) extracting at least the desorbed gaseous carbon dioxide while still injecting or circulating steam at ambient atmospheric pressure conditions into the unit; and (c) bringing the sorbent material to ambient atmospheric temperature conditions. The speed of steam flow through the unit in step (b1) or on average in steps (b1)-(b3) is in the range of 0.5-10 times the speed of the adsorption in step (a).

24 Claims, 4 Drawing Sheets

(51) Int. Cl.

| | |
|---|---|
| ***B01D 53/26*** | (2006.01) |
| ***B01D 53/62*** | (2006.01) |
| ***B01D 53/96*** | (2006.01) |
| *F01N 3/08* | (2006.01) |

(52) U.S. Cl.

CPC .......... *B01D 53/04* (2013.01); *B01D 53/0407* (2013.01); *B01D 53/265* (2013.01); *B01D 53/62* (2013.01); *B01D 53/96* (2013.01); *B01D 2256/22* (2013.01); *B01D 2257/504* (2013.01); *B01D 2258/06* (2013.01); *B01D 2259/40007* (2013.01); *B01D 2259/40009* (2013.01); *B01D 2259/40077* (2013.01); *B01D 2259/40086* (2013.01); *B01D 2259/4009* (2013.01); *F01N 3/0857* (2013.01)

(56) References Cited

U.S. PATENT DOCUMENTS

| | | | | |
|---|---|---|---|---|
| 8,500,854 | B1 | 8/2013 | Pennline et al. | |
| 8,500,860 | B2 | 8/2013 | Eisenberger | |
| 8,834,822 | B1 | 9/2014 | Gay et al. | |
| 9,884,294 | B2 | 2/2018 | Krutka et al. | |
| 10,239,017 | B2 | 3/2019 | Eisenberger et al. | |
| 2011/0088550 | A1 | 4/2011 | Tirio | |
| 2012/0076711 | A1 | 3/2012 | Gebald et al. | |
| 2013/0312606 | A1* | 11/2013 | Eisenberger | B01D 53/18 96/121 |
| 2014/0010719 | A1* | 1/2014 | Eisenberger | B01D 53/08 422/178 |
| 2014/0096684 | A1 | 4/2014 | Ogino | |
| 2015/0182904 | A1 | 7/2015 | Roestenberg et al. | |
| 2015/0360168 | A1* | 12/2015 | Zubrin | B01D 53/04 96/127 |
| 2016/0074803 | A1 | 3/2016 | Gebald et al. | |
| 2017/0203249 | A1* | 7/2017 | Gebald | B01D 53/62 |
| 2018/0169568 | A1* | 6/2018 | Eisenberger | B01J 20/3204 |
| 2018/0214822 | A1 | 8/2018 | Eisenberger | |
| 2018/0272266 | A1 | 9/2018 | Sprachmann et al. | |
| 2019/0255480 | A1 | 8/2019 | Wurzbacher et al. | |

FOREIGN PATENT DOCUMENTS

| | | | |
|---|---|---|---|
| EP | 2 986 357 | B1 | 2/2018 |
| EP | 3 191 210 | B1 | 7/2018 |
| EP | 2 867 600 | B1 | 2/2019 |
| EP | 2 563 495 | B1 | 9/2019 |
| EP | 3 191 211 | B1 | 2/2022 |
| GB | 1129543 | A | 10/1968 |
| GB | 1 296 889 | A | 11/1972 |
| WO | 2011/049759 | A1 | 4/2011 |
| WO | 2012/168346 | A1 | 12/2012 |
| WO | 2013/166432 | A1 | 11/2013 |
| WO | 2015/103401 | A1 | 7/2015 |
| WO | 2016/037668 | A1 | 3/2016 |
| WO | 2019/238488 | A1 | 12/2019 |

OTHER PUBLICATIONS

European Patent Application No. 20 186 310.7 filed Jul. 16, 2020.

European Patent Application No. 20 181 440.7 filed Jun. 22, 2020.

International Search Report issued Jul. 23, 2021 in International Application No. PCT/EP2021/063940.

Written Opinion of the International Searching Authority issued Jul. 23, 2021 in International Application No. PCT/EP2021/063940.

* cited by examiner

ATMOSPHERIC STEAM DESORPTION FOR DIRECT AIR CAPTURE

CROSS REFERENCE TO RELATED APPLICATIONS

This application is a National Stage of International Application No. PCT/EP2021/063940 filed May 25, 2021, claiming priority based on European Application No. 20 176 844.7 filed May 27,2020.

TECHNICAL FIELD

The present invention relates to a method for the regeneration of sorbents for usage in cyclic adsorption-desorption process for the capture of CO2 from atmospheric air, and to the use of such a method for direct air capture (DAC).

PRIOR ART

Gas separation by adsorption/desorption and specifically the capture of carbon dioxide from atmospheric air—known as direct air capture (DAC)—is a field of growing interest in light of measures aimed at reducing the impact of greenhouse gases. While the adsorption of atmospheric CO2 aims to condition the flowing atmospheric air as little as possible while producing the lowest possible pressure drop with the highest possible air throughput (EP-A-2986357 and US-A-20190255480), conditions of desorption are significantly more complex and are based on the wide body of knowledge from other industries in the gas separation field.

While classical capture of CO2 from flue gases with high CO2 concentrations can rely uniquely on a pressure or temperature swing, DAC with low CO2 concentrations must combine measures of shifting equilibrium to achieve attractive working capacities. Thus, desorption methods have in the past combined temperature (U.S. Pat. No. 8,491,705) and vacuum swings and purge gas flows (U.S. Pat. No. 10,239,017) with temperature swings and vacuums under steam flows where temperature swings were realized with heat exchangers (US-A-2017203249, US-A-2016074803). Conductive heating can be well controlled, avoids near saturation instabilities (i.e. two-phase flows) and does not load sorbent materials with large amounts of liquid water. For all its benefits, conductive heat transfer through typical sorbents materials—granular beds of high porosity—is rather poor and heat exchangers displace sorbent material, reducing output and making such solutions economically unattractive for the widespread application of DAC.

To address this drawback, steam desorption (either pure of assisted for example with vacuum) processes have drawn attention for application to DAC (US-A-2015182904, US-A-2014096684, US-A-2018214822, US-A-2017203249, US-A-2011088550, U.S. Pat. No. 9,884,294B2, EP2867600B1, EP3191211, EP3089809). These are largely based on steam processes from other industries where both saturated and superheated steam has been used for regeneration of sorbents (GB1296889A, GB1129543, U.S. Pat. No. 7,288,136, US-A-2018272266, U.S. Pat. No. 8,500, 854). Steam methods achieve fast heating times and can utilize the steam further for purging and drying without displacing sorbent with heat exchange elements. Most of these methods rely on assisting pressure swing to support the impact of the applied temperature swing and sweep of steam. Vacuum compression systems can however be costly and require high investments due to the large gas conduits required for low density gas flows. Further, vacuum system are prone to leakages, which may compromise product quality. Finally, the strong dependence of the temperature of heat delivery on the saturation conditions of steam either limit the desorption processes to low temperatures in the range of 50-70° C. or require the usage of non-condensing superheated steam. The former may be suitable to certain DAC sorbent classes however is not applicable to the widely utilized class of amine-functionalized solids. The latter relies on convective heat transport to achieve temperatures above the saturation condition and must have very high volume flows and correspondingly costly equipment investment.

Some methods have focused therefore on atmospheric steam desorption methods wherein a sorbent material is heated (EP-A-3191210), or supplied with steam at near or at atmospheric conditions (EP-A-2089139). A further examples of steam desorption under atmospheric conditions for the regeneration of a DAC sorbent (EP-A-2563495 and U.S. Pat. No. 8,500,860) apply a steam flow at atmospheric or slightly over atmospheric pressure having steam temperatures up to 130° C. The inventors argue that the steam will initially condense releasing latent heat at its saturation temperature, thereby rapidly heating the sorbent. Once the sorbent is at temperature, steam will pass through sorbent providing a purging function without condensing. For this purpose the inventors require applying superheated steam—and due to the at least atmospheric pressure process a saturation pressure of at least 1 bar(A)—so as to prevent condensation and recover the latent heat of the steam with heat recovery methods. Correspondingly all working examples focus on steam pressures greater than +100 mbar (g) against atmospheric pressures. For purpose-developed DAC devices of the prior art relying on vacuum pressures for sealing, overpressure poses very serious structural challenges. Further, to handle the air contained in the adsorber structure and protect the sorbent material from degradation the inventors applied a separate air removal step—described as partial vacuum—prior to the application of heating steam. Further still, they prefer a vacuum cooling step at the end of the desorption process to bring the sorbent material to adsorption conditions without exposing it to oxygen. The inventors describe the overall behaviour of a heating and sweeping with steam, they fail to disclose how this can be practically realized in real adsorber structures suitable for DAC.

WO-A-2019238488 discloses a method for separating gaseous carbon dioxide and water from a gas mixture by cyclic adsorption/desorption using a sorbent material adsorbing said carbon dioxide, comprising the following repeating steps: (a) contacting said gas mixture with said sorbent material in an adsorption step; (b) evacuating said unit and/or heating said sorbent material in a desorption step and extracting the gaseous carbon dioxide and water vapour and separating gaseous carbon dioxide from water vapour downstream of the unit; (c) cooling the adsorber structure with said sorbent material and re-pressurisation of the unit. In step (c) the heat released is recovered and stored in a first heat storage device; during step (b) the sensible and/or latent heat of gaseous carbon dioxide and water vapour as product gases is recovered and stored in second heat storage device; and during step (b) the heat required for heating said sorbent material in said unit is supplied from heat recovered from previous sequence(s) of said unit.

WO-A-2013166432 discloses a system and method of reducing the net carbon dioxide footprint of an industrial process that generates power from the combustion of hydrocarbon fuels in which ambient air is admixed with up to 50% by volume of an effluent gas from the power generator of the industrial process, in order to substantially increase the $CO_2$ concentration in the air prior to treatment. The treatment comprises adsorbing $CO_2$ from the admixed ambient air utilizing a cooled, porous substrate-supported amine adsorbent, wherein the porous substrate initially contacts the mixed ambient air containing condensed water in its pores, which act as an intrinsic coolant with respect to the exothermic heat generated by the adsorption process. In addition, prior to regenerating the supported adsorbent, air pressure is substantially reduced in the sealed regeneration chamber and the low-pressure chamber is placed in fluid connection with a higher-pressure regeneration chamber containing steam and carbon dioxide, to preheat the sorbent to be regenerated and to quickly cool the regenerated sorbent prior to use for further $CO_2$ adsorption.

GB1296889 discloses, that carbon dioxide can be separated from mixtures with non-acid gases such as air by sorption on a weakly basic ion exchange resin followed by desorption with steam under conditions such that the steam condenses at the inlet end of the resin bed and a front of condensing steam then progressively passes through the bed displacing the carbon dioxide. Sorption is suitably conducted at 40-90 F and at a relative humidity of 75-90%. The preferred ion exchanger is a polystyrene-divinylbenzene copolymer containing polyamino functional groups, each of which comprises at least one secondary amino nitrogen atom.

SUMMARY OF THE INVENTION

The present invention relates to a process and devices for the desorption of a sorbent suitable for direct air capture of $CO_2$ from ambient atmospheric air using a flow of steam at atmospheric pressure conditions.

According to this invention, a method for capturing $CO_2$ from ambient atmospheric air is conducted with two basic steps:

- Step a): the sorbent contained in a unit is exposed to an ambient atmospheric air flow and loaded with $CO_2$.
- Step b) the sorbent contained in a unit is isolated from the ambient atmospheric air flow and immediately exposed to a stream of steam until the at least a portion of the captured $CO_2$ in step a) is released at which point the steam flow is stopped and the cycle repeats from step a).

In the context of this disclosure, the expressions "ambient atmospheric pressure" and "ambient atmospheric temperature" refer to the pressure and temperature conditions to that a plant that is operated outdoors is exposed to, i.e. typically ambient atmospheric pressure stands for pressures in the range of 0.8 to 1.1 barabs and typically ambient atmospheric temperature refers to temperatures in the range of −40 to 60° C., more typically −30 to 45° C. Preferably the gas mixture used as input for the process is atmospheric air, which normally implies a $CO_2$ concentration in the range of 0.03-0.06% by volume. However, also air with lower or higher $CO_2$ concentration can be used as input for the process, e.g. with a concentration of 0.1-0.5% by volume, so generally speaking preferably the input $CO_2$ concentration of the input gas mixture is in the range of 0.01-0.5% by volume.

Suitable and preferred sorbents for use in the present method have a process cyclical $CO_2$ capacity in the range of 0.3 to 3 mmol/g and/or a water uptake of less than 70%. They can take the form of a solid material, which can be in the form of one or an assembly of contiguous layers/coatings or of particular nature (typically polymeric material), which is surface modified and/or porous to provide for carbon dioxide adsorption. The corresponding surface modification can be provided by impregnation, grafting and/or bonding of corresponding functionalities, in particular primary and/or secondary amine functionalities. The sorbent material can be an amine-functionalized solid adsorbent or X2C03, wherein X is K, Na, Li or a mixture thereof, preferably grafted, bonded and/or impregnated onto a porous granular support, e.g. active carbon. For example the material can be a weak-base ion exchange resin and/or amine-functionalized cellulose and/or amine-functionalized silica and/or amine-functionalized carbons and/or amine-functionalized metal organic frameworks and/or other amine-functionalized polymeric adsorbents. Another sorbent material suitable for use with this invention can be amine functionalized cellulose as described in WO2012/168346. Such sorbents can contain different type of amino functionalization and polymers, such as immobilized aminosilane-based sorbents as reported in U.S. Pat. No. 8,834,822 or materials according to WO-A-2011/049759 describing an ion exchange material comprising an aminoalkylated bead polymer for the removal of carbon dioxide from industrial applications. Another possible sorbent is the one of WO-A-2016/037668 for reversibly adsorbing $CO_2$ from a gas mixture, here the sorbent is composed of a polymeric adsorbent having a primary amino functionality. The materials can also be of the type as disclosed in EP 20 186 310.7 (incorporated by reference). Also, they can be of the type as disclosed in EP 20 181 440.7 (incorporated by reference), so materials where a solid inorganic or organic, non-polymeric or polymeric support material is functionalized on the surface with amino functionalities capable of reversibly binding carbon dioxide, with a specific BET surface area, in the range of 1-20 m2/g. The solid inorganic or organic, non-polymeric or polymeric support material can be an organic or inorganic polymeric support, preferably an organic polymeric support, in particular a polystyrene based material, preferably a styrene divinylbenzene copolymer, preferably to form the sorbent material surface functionalized with primary amine, preferably methyl amine, most preferably benzylamine moieties, wherein the solid polymeric support material is preferably obtained in an emulsion polymerization process, or can be a non-polymeric inorganic support, preferably selected from the group consisting of: silica ($SiO_2$), alumina ($Al_2O_3$), titania ($TiO_2$), magnesia (MgO), clays, as well as mixed forms thereof, such as silica-alumina ($SiO_2$—$Al_2O_3$), or mixtures thereof.

The sorbent material generally, and/or in the above case the solid inorganic or organic, non-polymeric or polymeric support material, can be in the form of at least one of monolith, layer or sheet, hollow or solid fibres, preferably in woven or nonwoven structures, hollow or solid particles, or extrudates, wherein preferably it takes the form of preferably essentially spherical beads with a particle size (D50) in the range of 0.01-1.5 mm, preferably in the range of 0.30-1.25 mm, or the solid inorganic or organic, non-polymeric or polymeric support material is in the form of solid particles embedded in a porous or non-porous matrix.

Step b can actually be seen as series of steps b0-b3 or in terms of steam input b1-b3 wherein b0 involves shutting off the ambient air flow through, b1 involves ejecting air from the unit which is pushed out by the steam, step b2 involves the rapid heat-up and initial thermal swing of the sorbent material under the influence of condensing steam at the defined pressure conditions and step b3 involves the continuation of the application of steam to the unit during which time it to a large extent does not condense and correspondingly purges the sorbent material.

Novel in step b against the disclosures of the prior art is inter-alia the air ejection of b1 and preferably the fact that there is no active cooling of the sorbent after step b3 and before resuming the adsorption. The surprising effectiveness and simplicity of this desorption method is a significant novelty against the prior art wherein specific air removal and cooling steps are prevalent when dealing with DAC relevant sorbents.

More generally speaking, the present invention proposes a method for separating gaseous carbon dioxide from a gas mixture, containing said gaseous carbon dioxide as well as further gases different from gaseous carbon dioxide by cyclic adsorption/desorption using a sorbent material adsorbing said gaseous carbon dioxide, using a unit containing an adsorber structure with said sorbent material, the adsorber structure being heatable to a temperature of at least 60° C. for the desorption of at least said gaseous carbon dioxide and the unit being openable to flow-through of the gas mixture and for contacting it with the sorbent material for an adsorption step.

According to the invention, the method comprises the following sequential and in this sequence repeating steps:

(a) contacting said gas mixture with the sorbent material to allow at least said gaseous carbon dioxide to adsorb on the sorbent material under ambient atmospheric pressure conditions and ambient atmospheric temperature conditions in an adsorption step;

(b0) isolating said sorbent with adsorbed carbon dioxide in said unit from said flow-through of gas mixture while maintaining the temperature in the sorbent;

(b1) injecting a stream of saturated steam essentially at ambient atmospheric pressure conditions and thereby inducing an increase of the temperature of the sorbent from ambient atmospheric temperature to a temperature between 60 and 110° C. while pushing out air contained in the unit preferably while not yet directing the outflow of said unit to product collection, (b2,b3) extracting at least the desorbed gaseous carbon dioxide from the unit (when the desorption of CO2 is starting) and separating gaseous carbon dioxide from water by condensation in or downstream of the unit (the separation of carbon dioxide from water can take place directly downstream of the unit, as will be detailed further below, the stream exiting the unit may however also, at least in some of part of b2/b3, first pass another unit before carbon dioxide separated from water), while still injecting and/or circulating saturated steam at ambient atmospheric pressure conditions into said unit, thereby flushing and purging both steam and CO2 from the unit;

(c) bringing the sorbent material to ambient atmospheric temperature conditions.

One of the key and preferred elements of the proposed invention is that the process is controlled such that the speed of steam flow through the unit in step (b1) and/or on average in steps (b1)-(b3) is in the range of 0.5-10 times the speed of the adsorption gas flow in step (a).

So according to this invention, the adsorption step (a) is using an adsorption gas flow speed, and the speed of steam flow through the adsorber structure in desorption (in step (b1) and/or on average in steps (b1)-(b3)) lies in the range of 0.5-10 or preferably 0.5-6 times the adsorption gas flow speed through the same adsorber structure and further preferably speed of steam flow through the adsorber structure in desorption is in the range of 0.1 to 2 m/s, preferably in the range of 0.1 to 1 m/s, more preferably in the range of 0.1-0.4 or 0.2-0.4 m/s.

Firstly, this specification creates a sharp desorption front in adsorber structures, which has the effect of sinking the required thermal energy demand for steam to far below what is declared in the prior art and increasing the process output (again to far higher than that declared in the prior art) by reducing the cycle time and increasing the cyclic capacity. The specification of this speed is not encountered in the prior art on atmospheric steam desorption processes and is an important novelty which improves the effectiveness of steam application. Further yet, the materials of the closest prior art inventions apply structured adsorbers, wherein the flow paths of adsorption air flow and desorption steam are fundamentally the same through parallel channels. In order to achieve the steam flow speeds and benefits foreseen by this invention, the steam demand would be prohibitively high as will be demonstrated in Example 6. On the other hand, too high steam speed values can in certain DAC devices lead to problematic overpressures owing to the pressure drop through adsorber structures and prohibitively large steam demands as will be shown in Example 7.

One of the supposed disadvantages of saturated steam processes encountered in the prior art for certain porous solid sorbents is the accumulation of liquid water in the porous bodies and the reduction of CO2 uptake kinetics; being particularly accentuated at higher relative humidity during adsorption. One other surprising benefit of the herein disclosed process is the insensitivity to varying relative humidity. There has been little to no reduction in cyclic capacity of adsorption observed at relative humidity of 90-100%. Further, it has been found that the herein disclosed process can maintain favourable cyclic capacity of adsorption even under dry adsorption conditions whereas processes, which explicitly dry the sorbent after steam application (such as those of the prior art), can see a 50-70% capacity reduction.

One of the key issues of the present invention is to find and provide a process which allows the desorption of the carbon dioxide loaded sorbent without having to evacuate the unit first. This is reached by having comparatively high steam velocities. One gist of the present invention is therefore not so much how to achieve a high steam flow, that is something that can be engineered depending on the need as will be detailed below. One gist of the present invention is to have found that an efficient desorption is possible, if, compared with prior art processes, the steam speed is increased significantly in relation with the adsorption gas flow through the adsorber. One possibility to achieve a higher steam speed than reported for prior art devices is to increase the pressure with which the steam is introduced into the adsorber structure. Another possibility to achieve higher steam speed than reported for prior art devices is to use a smaller flow cross-section for the steam flow phase, which can be implemented by a different flow path for the steam than for the adsorption gas flow. For example, it is possible to have an adsorber structure of stacked layers of adsorbers having a long extension along the flow path of the adsorption gas flow and having a short extension in a direction parallel to the layers and perpendicular to the long extension axis. This short extension direction can then be used for the steam flow in the steam phases and since the pressure drop along this short extension is much lower the higher flow speed for the steam can be achieved without significant increase of the pressure drop over the structure. Alternatively, such a different path for adsorption and steam injection can be implemented in practice by having a unit with a housing structure which has a short flow through length along a first direction, which is the adsorption flow through direction, and which has a long flow through length along a second, preferably orthogonal direction, which is the desorption flow through direction for the steam. This in particular to make sure that the steam contacts as much as possible of the sorbent while passing through the unit. For this, the unit may have a large opening at two opposing ends of the adsorption flow through direction, which are open during adsorption, and which are closed during desorption, and smaller openings in opposing circumferential side walls of the unit for the desorption, which are closed during adsorption and which are open during desorption for passing the steam through for desorption in a direction orthogonal to the one during adsorption.

According to a preferred embodiment of the invention the higher speed for the steam flow phase in steps (b1)-(b3) is achieved by changing the flow cross-section available for the steam flow as compared to the flow cross-section available for the gas mixture in step (a). This is implemented in that method is carried out under conditions that the cross-section of the gas flow path of the gas mixture in step (a) is larger than the gas flow path of the steam in steps (b1)-(b3) through said unit. Preferably the cross-section of the gas flow path of the gas mixture in step (a) is larger by a factor of 1.5 preferably 10 or 50 than the gas flow path of the steam in steps (b1)-(b3) through said unit. The cross-section in the steam steps is reduced in a way which maintains the surface of the adsorber structures exposed the same as in the adsorption step (a). As mentioned above, for a structure having a long axis along the flow direction of the gas mixture in step (a) and a smaller axis along a direction orthogonal to that flow direction and parallel to the layers of a stacked layered adsorber structure, this can be implemented by having the steam flow in steps (b1)-(b3) along this direction orthogonal to the flow direction in step (a). Assuming a stacked layered adsorber structure where adsorption takes place primarily at the surfaces of each layer, and where channels are formed between these stacked adsorber layers, a reduction in flow cross-section for the steam allowing for higher steam flow can also be implemented by inserting a corresponding stack of blocking layers engaging and interlacing in the channels between the adsorber layers in steps (b1)-(b3) but not contacting the surfaces of the adsorber layers, leading to flow through channels for the steam having a smaller cross-section than available for the gas mixture in step (a).

According to a preferred embodiment therefore, the speed of steam flow through the unit in step (b1) and/or on average in steps (b1)-(b3) is in the range of 1-5 times, preferably 2-4 times, of the speed of the adsorption gas flow in step (a).

The speed of steam flow through the unit in step (b1) and/or on average in steps (b1)-(b3) can preferably be in the range of 0.1 to 2 m/s, preferably in the range of 0.1 to 1 m/s, more preferably in the range of 0.1-0.4 m/s.

The speed of steam is calculated for the respective step by taking the distance between the inlet cross-section for the steam at the first point along its flow path where it contacts sorbent material and the outlet cross-section for the steam at the last point along its flow path where in contacts sorbent material and the time it takes for the steam to pass from the inlet to the outlet. If the inlet cross-section and the outlet cross-section surfaces are not parallel, the measure for the purposes of determining the speed of steam according to this invention is the shortest distance between these two surfaces. For the purposes of this invention the speed of steam for a specific step b1, b2 or b3 is the average of the speed of steam in during corresponding step.

Notably, the speed for the steam and for the adsorption step is not the speed at a large opening of a general adsorber structure. It is the speed in the region where the corresponding stream contacts the adsorber. So if there is a stack of layers forming the adsorber, it is the speed in the channels between these layers. And if there are several layers and several flow-through channels, the speed is the average speed over the speed in the individual channels of the whole adsorber structure.

Notably, the pathway for the steam does not have to be the same as the pathway for the ambient air in the adsorption step (a) or in the cooling step (c). In fact, according to a preferred embodiment the pathways are intentionally chosen to be different to achieve the desired difference in gas flow speed.

The speed of the adsorption gas flow in step (a) is similarly calculated for the respective step by taking the distance between the inlet cross-section for the gas mixture at the first point along its flow path where it contacts sorbent material and the outlet cross-section for the gas mixture at the last point along its flow path where in contacts sorbent material in step (a) and the time it takes for the gas mixture to pass from the inlet to the outlet. If the inlet cross-section and the outlet cross-section surfaces are not parallel, the measure for the purposes of determining the speed of gas mixture according to this invention is the shortest distance between these two surfaces. The speed of gas mixture is thus again not a local measure within the adsorber structure but it is a global measure between the inlet and the outlet of the corresponding unit taking the pathway for the gas mixture.

According to yet another preferred embodiment, step (c) is carried out exclusively by contacting said gas mixture with the sorbent material under ambient atmospheric pressure conditions and ambient atmospheric temperature conditions to evaporate and carry away water in the unit and to bring the sorbent material to ambient atmospheric temperature conditions. In other words, according to a preferred embodiment there is no separate step (c), but rather this step (c) is just the first phase of the next adsorption step and is combined with the actual adsorption step (a). This surprisingly simple process without applying any particular active cooling and/or vacuum cooling, as will be detailed further below, allows for a surprisingly fast cooling down of the adsorber structure and thus permits to have a short time span in which the sorbent is exposed to high temperature oxygen.

Alternatively, in step (c) the cooling process can be accelerated or made more gentle to the sorbent by vacuum cooling or by liquid water injection at least in a first phase, preferably until reaching a sorbent temperature where there is no damage to the sorbent material (typically less than 80° C., less than 70° C. or less than 60° C. or even less than 50° C.), and only in a second phase contacting the gas mixture with the sorbent material under ambient atmospheric pressure conditions and ambient atmospheric temperature conditions for the rest of the cooling.

As pointed out above, the gas flow path of the gas mixture in step (a) through the unit can preferably be different from the gas flow path of the steam in steps (b1)-(b3) through said unit.

This is possible in that the gas flow path of the gas mixture in step (a) is on average along a first direction, and the gas flow path of the steam in steps (b1)-(b3) is on average along a second direction, wherein preferably the first and second direction are essentially orthogonal. This different path for adsorption and steam injection can e.g. be implemented in practice by having a unit with a housing structure which has a short flow through length along a first direction, which is the adsorption flow through direction, and which has a long flow through length along a second, preferably orthogonal direction, which is the desorption flow through direction for the steam. This in particular to make sure that the steam contacts as much as possible of the sorbent while passing through the unit. For this, the unit may have a large opening at two opposing ends of the adsorption flow through direction, which are open during adsorption, and which are closed during desorption, and smaller openings in opposing circumferential side walls of the unit for the desorption, which are closed during adsorption and which are open during desorption for passing the steam through for desorption in a direction orthogonal to the one during adsorption.

So another key issue of the present invention is to find and provide comparatively high steam velocities by changing the flow direction. There are two main ways to realize this. One possibility is to increase the pressure with which steam is introduced to the adsorber structure under desorption. This method serves to increase the steam flow velocity by increasing the steam mass flow rate and correspondingly the energy demand of the desorption process. According to this aspect of the invention in contrast to this a different flow path for steam and/or a different cross section of the flow path is proposed, increasing the steam flow velocity significantly while retaining the same steam mass flow rate and thereby the energy demand of the process. Hereby it is possible for example to have an adsorber structure of N stacked layers of adsorbers having a first flow direction for adsorption gas flow and a second flow direction for steam flow perpendicular to the first direction. The first flow direction is characterized by a large parallel through flow surface area formed by the N stacked layers and short flow distances through the N stacked layers hereby producing a low pressure drop in the adsorption gas flow. Conversely, the steam flow direction can pass through a significantly smaller cross section characterized substantially by the length and breadth of the adsorber structure; passing serially through N stacked layers. As such the second flow direction can have a cross section available for through flow of substantially 1/Nth of the first flow direction. Correspondingly, a steam flow applied to the second flow direction would with the same mass flow produce an N times higher gas speed through the stacked layers of adsorbers than when applied along the first gas flow direction. For this, the unit may have a large opening at two opposing ends of the adsorption flow through direction, which are open during adsorption, and which are closed during desorption, and smaller openings in opposing circumferential side walls of the unit for the desorption, which are closed during adsorption and which are open during desorption for passing the steam through for desorption in a direction orthogonal to the one during adsorption. Surprising herein is that despite the large spacing between stacked layers of adsorbers, a homogenous steam flow along the second flow direction can be realized contacting the sorbent material homogeneously with steam. Further still and more surprisingly, the energy demand of the process can in fact be reduced due a reduction in the duration of exposure of the sorbent to steam.

Typically, to have a low pressure drop across the adsorber structure, the length of the adsorber structure along the flow direction of the adsorption gas flow is short, while in the direction orthogonal to this direction the adsorber structure is longer. This aspect ratio can be used for achieving the desired different flow speeds of gas and steam in steps (a) and (c), respectively, by letting the steam in steps b pass along an orthogonal direction to the adsorption gas flow having a smaller footprint and allowing for higher flow speed.

According to yet another preferred embodiment, the specific steam flow rate of the desorption process in steps (b1)-(b3) is constant, and preferably in the range of 1-10 kg/h/sorbent material, preferably less than 5 kg/h/sorbent material.

Further the ratio of total fresh steam amount used in the totality of step b) to the released CO2—heretofore called the steam ratio (SR) can be less than 40:1 mol H2O/mol CO2 preferably less than 20:1 mol H2O/mol CO2. Again, this SR and specific steam flow rate thanks in part to the effectiveness of high-speed steam flows lays far below the values found in the prior art on atmospheric steam desorption processes which are declared to be 36 kg/h/kg Sorbent and between 1000 and 2000 mol H2O/mol CO2 (assuming an optimistic 1 and 2 mmol/g cyclic capacity respectively).

So according to yet another preferred embodiment, the ratio of total cumulative fresh steam in steps (b1)-(b3) to the released carbon dioxide is smaller than 40:1, preferably smaller than 20:1.

Preferably, the duration of steps (b1)-(b3), or of steps (b0)-(b3), is less than 15 minutes, preferably less than 10 minutes, more preferably less than 6 minutes. Again this point is dramatically different from the inventions of the prior art which declare desorption times of 25 minutes having correspondingly far higher energy demands due to prolonged steam application as well as significantly reduced output.

In another embodiment of the invention, a low-pressure blower can be used to maintain the pressure at the outlet of the unit within the desired range. This device may be required particularly to distribute the desorbed gases and steam to further DAC plant elements and overcome the associated pressure drop of long piping networks without elevating the pressure of the unit under desorption.

Preferably, extraction of carbon dioxide is started when the carbon dioxide concentration after removal of steam, preferably at the outlet of the condenser, is above 20%, preferably above 30%, and/or extraction of carbon dioxide is stopped when the carbon dioxide flow at the outlet of the separation device, preferably the condenser, is below 1.2 l/min/kg sorbent preferably below 0.61/min/kg sorbent.

In a further preferred embodiment of the invention the pressure of the unit in step b) is substantially atmospheric, preferably in the range of +/−100 mbar(g) of the local ambient atmospheric pressure conditions, more preferably in the range of +/−50 mbar(g), wherein the steam exists in a saturated state at the local pressure conditions. Respecting the lower bound of this limit is essential in order to avoid expensive vacuum pumps and respecting the upper limit is essential to avoid complex structures, which must seal the large devices of DAC plants found in the prior at overpressures. This is a strong difference to the conditions described in the prior art on atmospheric steam processes where overpressures of up to +200 mbar (g) must be realized. Further, the prior art on atmospheric steam desorption of DAC sorbents recommends actually the usage of superheated steam to avoid condensation under steam stripping to enable thermal energy recovery of latent heat. It will be shown below and in Example 5 that there are other heat recovery methods, which do not require superheated steam.

In yet another embodiment of the invention, steam is applied to a first unit in step b3 and then the steam and desorbed CO2 leaving this first unit can be directed towards a second unit undergoing step b1 and/or b2 wherein the steam and CO2 are not separated from one another between the units.

In yet another embodiment of the invention, steam is applied to a first unit in step b3 and then the steam and desorbed CO2 leaving this first unit can be directed towards a second unit undergoing step b2 wherein the steam and CO2 are not separated from one another between the units and wherein step b1 of the second unit is supplied with steam not having passed through the first unit.

This solution is particularly novel and beneficial for the process for a number of reasons. Firstly, once produced steam applied to the first adsorber structure in step b3 can be reapplied towards the heating of b2 where it will condense and be separated from a portion of the CO2 produced in step b3 or the first adsorber structure. Thereby the system does not require a separate condenser for steam separation. Further, hot saturated steam and enriched CO2 from the step b3 of the first adsorber structure will in contact with the cold sorbent in unit to condense the former releasing latent heat and adsorber at least a part of the latter releasing heat of adsorption and thereby heating the unit. In this fashion, a very effective direct heat recovery of applied steam in step b3 can be realized without the need for expensive recompression and condensation devices such as found in the prior art of steam process heat recovery.

So the flow of steam and desorbate exiting the unit in at least one of steps (b1)-(b3) is, according to another preferred embodiment, not directly fed to a steam or water/carbon dioxide separation device such as a condenser, but is first passing at least one further unit containing an adsorber structure with said sorbent material, the adsorber structure being heatable to a temperature of at least 60° C. for the desorption of at least said gaseous carbon dioxide and the unit being openable to flow-through of the gas mixture and for contacting it with the sorbent material for an adsorption step.

Also the present invention relates to a method for separating gaseous carbon dioxide from a gas mixture, containing said gaseous carbon dioxide as well as further gases different from gaseous carbon dioxide by cyclic adsorption/desorption using a sorbent material adsorbing said gaseous carbon dioxide, using at least two units, preferably at least 4 or at least 6 units each containing an adsorber structure with said sorbent material, the adsorber structure being heatable to a temperature of at least 60° C. for the desorption of at least said gaseous carbon dioxide and the unit being openable to flow-through of the gas mixture and for contacting it with the sorbent material for an adsorption step, and using a method as described above for the desorption in these units, wherein the operation of the units is synchronised in that there is at least one step for each unit in one cycle of the set of units, wherein the flow of steam and desorbate exiting a first unit in at least one of steps (b1)-(b3) is not directly fed to a steam or water/carbon dioxide separation device such as a condenser, but is first passing at least one further unit downstream of said first unit.

Last but not least, the present invention relates to a device for carrying out a method for separating gaseous carbon dioxide from a gas mixture, containing said gaseous carbon dioxide as well as further gases different from gaseous carbon dioxide by cyclic adsorption/desorption using a sorbent material adsorbing said gaseous carbon dioxide preferably according the above description, said device comprising a steam source;

at least one unit containing an adsorber structure with said sorbent material, the adsorber structure being heatable to a temperature of at least 60° C. for the desorption of at least said gaseous carbon dioxide and the unit being openable to flow-through of the gas mixture and for contacting it with the sorbent material for an adsorption step;

at least one steam or water/carbon dioxide separation device such as a condenser for separating carbon dioxide from water, wherein at the gas outlet side of said steam or water/carbon dioxide separation device such (condenser) there is at least one of, preferably both of a carbon dioxide concentration sensor and a gas flow sensor for controlling the desorption process, and a corresponding control unit to use the output of these sensors for controlling the process in line with the above method.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
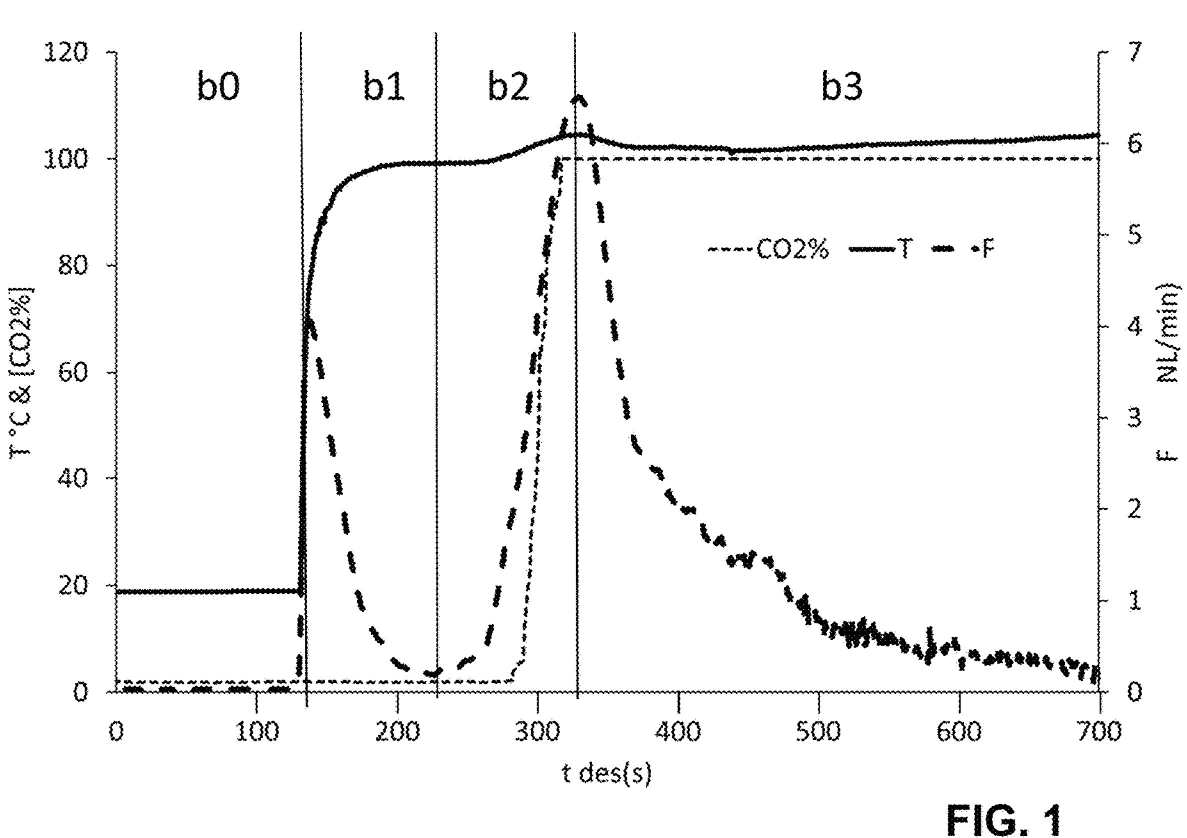
FIG. 1 shows the desorption of CO2 conducted under atmospheric steam desorption conditions using high speed steam conditions, in particular the temperature (solid line), the carbon dioxide percentage (short dashed line) and the gas flow (long dashed line) as a function of the desorption time.

Example 1: Desorption Profile and CO2 Quality of in Atmospheric Steam Desorption using High-Speed Steam Flow In this example the desorption profile of the desorption method of this invention is shown in detail in FIG. 1. The sorbent in a packed bed with a height 50 mm and a diameter of 150 mm was loaded with CO2 from ambient atmospheric air and contained in a unit. The outlet of the unit was attached to a condenser, at the outlet of which were monitored $CO_2$ concentration and flow rate. Within the unit, a temperature measurement was set near the upper surface of the sorbent. Importantly, the outlet of the instrumentation and substantially of the condenser was open to the atmosphere, which implies that the outlet of the unit containing sorbent was substantially at atmospheric pressure.

In an initial phase of adsorption (a) the unit was subjected to ambient air/ambient pressure flow through for a time span of 24 hours using a speed of ambient air flow ($V_{aa}$) of 0.037 m/s at a specific volume flow of 5.6 Nm3/h/kg sorbent having an ambient temperature of 20° C. with a relative humidity of 10%.

In step b0 of the desorption, the sorbent is isolated from the flow of ambient atmospheric air.

Immediately, thereafter in step b1 a flow of 5 kg $H_2O$/h/kg sorbent saturated steam is started having an inlet temperature of 101° C. The pressure at the outlet of the unit was atmospheric at 985 mbarabs. The saturation pressure of the steam therefore corresponds to the outlet pressure of the unit and the pressure drop over the sorbent material. The speed of the steam flow ($V_s$) in this example is 0.28 m/s. Immediately, a peak in flow (long dashed line) is registered having a near zero $CO_2$ concentration—this peak is air which is expelled from the unit by the flow of steam. The rise in sorbent temperature (solid line) occurs in the upper sorbent bed portion shortly thereafter and reaches 90° C. within 20 s and 96° C. within 38 s where it remains for the remainder of the step b1.

The rapid rise in temperature is due to the strong release of latent heat from condensing steam at the saturation temperature.

In step b2 the rise in gas flow and $CO_2$ content is delayed against the rise of temperature due largely to the appreciable dead volume of the condenser but reaches a near 100% $CO_2$ concentration and a peak flow of 6.5 NL/min about 200 s after the application of steam upon which point the steam breaks through the unit and condensate and steam begin flowing into the condenser.

The further rise in the temperature of the sorbent in b2 beyond the saturation temperature is, without being bound to any explanation, likely due to a light increase in the steam pressure due to the pressure drop of the evolved $CO_2$ passing through the instrumentation and condenser.

Within step b3, the tail of the $CO_2$ flow falls off gradually as the sorbent bed is purged by largely non-condensing steam until the steam input is stopped.

The total duration of the step b, composed of b1-b3; from initial steam application to the end of the steam supply is 9.5 min.

The total released capacity of $CO_2$ (accounting for additional gas trapped in the large dead volume of the condenser) is 1.02 mmol/g. The capacity is determined considering all $CO_2$ released between a $CO_2$ concentration above 30% (cut in point) and flow rate above 0.5 NL/min (cut out point), which is comparable to that achievable with other state of the art steam desorption processes, but herein achieved in a fraction of the time.

Further, the desorption process herein disclosed also delivers high quality $CO_2$.

Firstly, steam in step b1 is extremely effective in pushing out air out of the device which is thereby not mixed with desorbing $CO_2$ and further apparently not mixed with high temperature sorbent.

Secondly, due to the rapid rise in $CO_2$ concentration in step b2, very little flow arises during phases of low $CO_2$ concentration.

Thirdly, due to the application of atmospheric or slightly over atmospheric pressures, air is not aspirated into the device as is the case in vacuum systems.

Thereby, not only can a high instantaneous $CO_2$ concentration of 100% be reached, but also the cumulative batch $CO_2$ concentration can be in excess of 98% without the need of rejecting any appreciable amounts of product gas.

Specifically, in this example, a batch concentration of 98.8% was reached with a cut-in concentration of only 30% $CO_2$.

Figure 2:
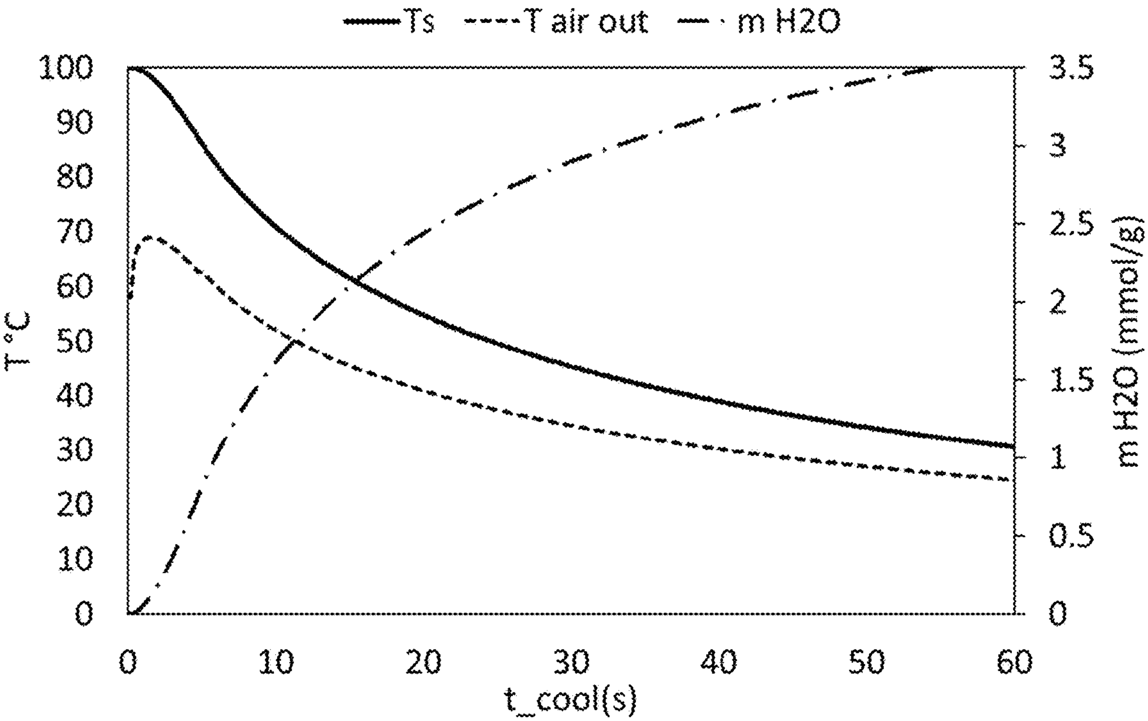
FIG. 2 shows the behaviour of the sorbent temperature (solid line) of the outlet air temperature (short dashed line) and of the total water mass (dashed dotted line) as a function of the cooling time in seconds.

Example 2: Simulation of Cooling of Sorbent after Atmospheric Steam Desorption under Ambient Air Flow In this example the cooling of the sorbent material in step c after the completion of a desorption according to the herein disclosed method has been simulated and is shown in FIG. 2.

Immediately after the steam flow is stopped at the end of step b, the adsorber structure temperature Ts is assumed at a 100° C. According to the process, it is immediately exposed to a flow of ambient atmospheric air in this case at a specific volume flow of 65 Nm3/h/kg sorbent having an ambient temperature of 12° C. with a relative humidity of 70% The outlet of the air from the adsorber structure is assumed to leave at 98% relative humidity at a temperature determined from the energy balance. The flow is assumed to have a ramp up of 5 s which corresponds to the realistic operation of fans. A convective heat transport coefficient was assumed to be 3 W/m2/K in the sorbent material which is consistent with literature values on packed bed heat convective transfer coefficients.

Due to the large liquid water content of the sorbent material after the desorption, a very strong evaporation occurs which produces a rapid temperature drop in Ts to below 70° C. in less than 10 s. This measure is important in view of the duration of amine sorbents under temperatures greater than 70° C. as the main degradation mechanism.

The air outlet temperature T air out rises at first due to the contact with the hot sorbent, the uptake of saturated steam and the relatively low flow rates at the start of the ramp up, before gradually falling. Beyond 70° C., the evaporative cooling of the adsorber structure falls off in importance and convective cooling in the sorbent bed further sinks the temperature to below 50° C. in less than 25 s at which point the adsorption of $CO_2$ from the ambient atmospheric air can proceed.

The cumulative amount of water m $H_2O$ which is evaporated from the adsorber structure reaches ca. 3.5 mmol/g until a temperature Ts of 30° C.—this water amount can be present on the sorbent after a desorption according to this method.

Combined with the short duration of the herein described desorption method, this short exposure of the adsorber structure to high temperature oxygen is unproblematic for the longevity of the therein contained sorbent material while providing vast simplification and output improvements against vacuum cooling methods known from the prior art.

Example 3: High-Speed Atmospheric Steam Desorption

Figures 3A, 3B:
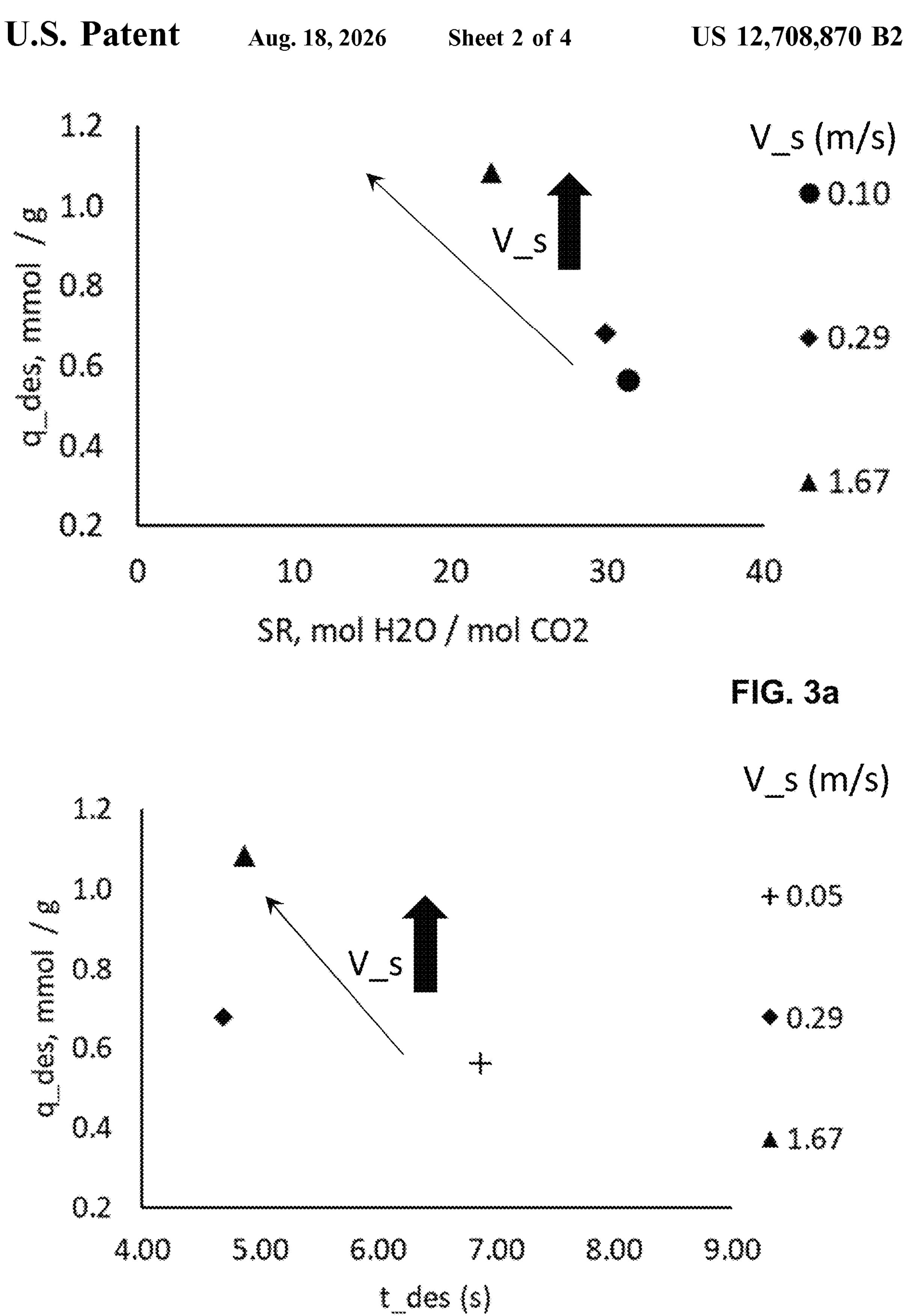
FIG. 3*a*-3*b* shows the desorption capacity as a function of the steam ratio for different steam flow speeds in the same sorbent bed in FIG. 3*a*, and the desorption capacity as a function of the desorption time in FIG. 3*b;*

In FIGS. 3*a* and 3*b* are shown various desorption capacities of atmospheric steam desorption conducted along the methods of this invention and largely following the evolution shown in FIG. 1.

To investigate the impact of varying steam flow speed V_s while maintaining the sorbent mass and the specific volume flow steam constant, the geometry of the packed bed of sorbent material was varied. Correspondingly, reduced cross section sorbent beds produced the highest steam flow speed V_s, whereas the widest cross sections produced the lowest speeds. The same specific volume flow rate of ca 3 kg/h/kg Sorbent was applied under conditions wherein the outlet pressure of the units containing the sorbent beds were maintained at atmospheric pressures.

The same instrumentation was used as that for Example 1 to record CO2 concentration and flow. As in Example 1, a cut in CO2 concentration of 30% and product cut out flow of 0.5 NL/min was applied.

In an initial phase of adsorption (a) the unit was subjected to ambient air/ambient pressure flow through for a time span of 24 hours using a speed of ambient air flow (V_aa) of 0.037 m/s at a specific volume flow of 5.6 Nm3/h/kg sorbent having an ambient temperature of 20° C. with a relative humidity of 10%.

FIG. **3*a*** shows the evolution of the resulting desorption capacity q_des against the steam ratio SR.

The steam ratio is the molar sum of applied steam in step b (b1-b3) to the molar sum of released CO2 between the cut-in and cut out points.

It has been found that increasing the steam flow speed V_s—again while maintaining the specific mass flow constant—surprisingly had the impact that both the capacity of desorption q_des increased AND the steam ratio decreased.

A similar evolution is seen in FIG. **3*b*** for the desorption capacity against the desorption time (defined as the time between the start of steam application and product cut out). Here the higher steam flow speeds V_s of >0.29 m/s produced nearly a halving of the desorption time along with an increase in capacity against runs conducted at 0.05 m/s. Obviously, the shorter desorption time t_des produces the generally lower steam ratio SR as simply the amount of steam, which must be injected into the process is reduced. However, also shorter desorption times t_des improve process output. The results shown in this example are unexpected and are not described or suggested in prior art documents related to atmospheric steam desorption processes.

Example 4: Steam Ratio for Atmospheric Steam Desorption

Figure 4:
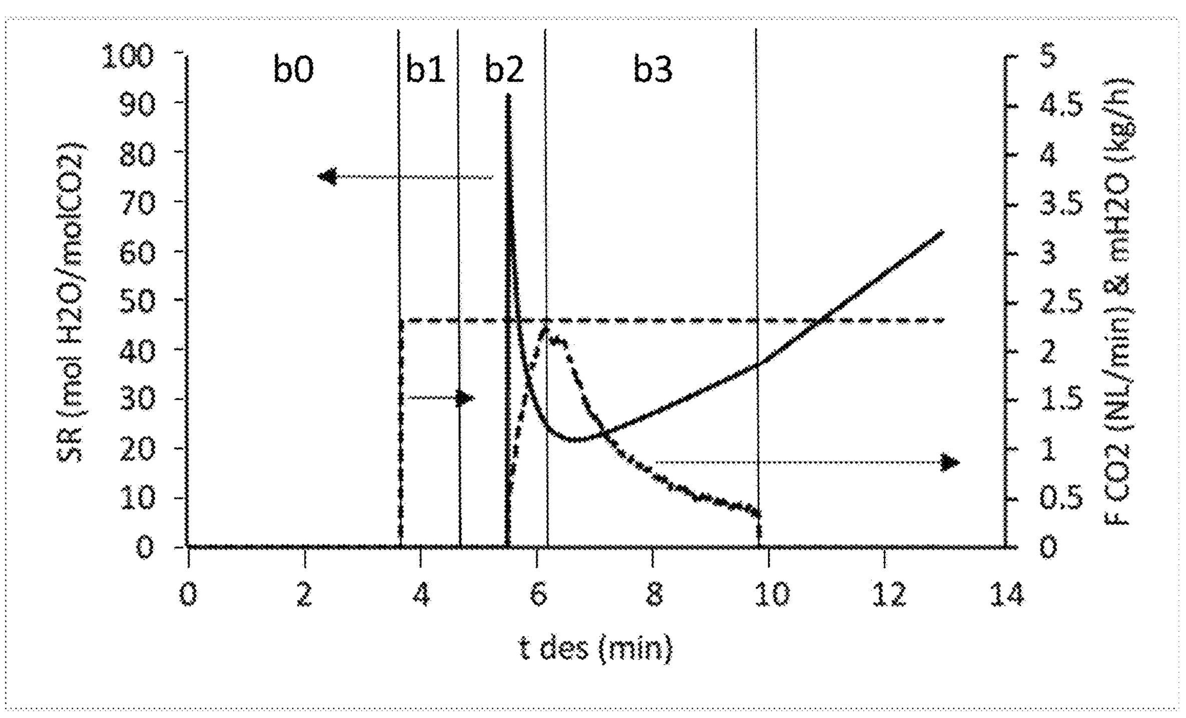
FIG. 4 shows desorption of carbon dioxide conducted under atmospheric steam desorption conditions as a function of the desorption time, in particular the steam ratio (solid line), the carbon dioxide flow rate (dashed line), and the water mass flow (angular dotted line)

For a further desorption of the same typical DAC sorbent using the method herein disclosed, the steam ratio SR—defines as the ratio of total molar sum of applied steam to the total molar sum of released CO2 between the cut-in and cut-out points—is shown in FIG. 4.

As in Example 1, there is a time gap of ca 100 s between the application of a constant steam flow—in this case of 2.2 kg/h—and the rise of the CO2 concentration and flow. In this period, obviously SR is infinite as no CO2 has been released.

As soon as CO2 production (above the 30% concentration cut-in) starts, SR sinks rapidly reaching a minimum of ca. 20 mol H2O/mol CO2 shortly after the peak CO2 flow rate.

Thereafter SR rises as the continued purging of the sorbent material produces the gradually sinking tail as also previously see in Example 1. Until the cut-out point at flows less than 0.5 NL/min SR rises again to 35 mol H2O/mol CO2.

The key to running a desorption process in the most effective way is to strike a balance between the lowest energy demand to keep operational costs low (SR minimization) with CO2 output maximization to best amortize investment costs. Therefore, likely the 'best' operating point lies somewhere between the minimum SR and cut-out of CO2 production.

All the same, with such experimentally demonstrated SR, economically feasible DAC operation can be foreseen.

Example 5: Heat Recovery Implementation for Atmospheric Steam Desorption in Staggered Units In this example, the desorption method of this invention is applied to the heat recovery methods comprising at least one step of sequentially feeding desorbing units.

A schema of two adsorbed units 1 and 2 is shown in FIG. **5*a*. A fresh steam stream 8 feeds the device and three valves 5, 6 and 7 can be used to either apply steam to adsorber structures 1 or 2 individually or 1 and 2 in a series fashion making use of the bypass conduit 3 and 4**.

A condenser 9 captures condensed steam before desorbed CO2 is passed onto the flow F and CO2 concentration Q sensors.

In Examples 1 to 4, this setup was used without the bypass conduit 3 and 4 and the second adsorber structure 2.

The setup here is operated in the fashion described before but in that CO2 and steam leaving one adsorber structure in the purge step b3 can be injected towards the air ejection step b1 and heat up step b2 of a second adsorber structure.

In this setup, in the first step b0 the adsorber structures 1 and 2 are separated from the adsorbing air and steam flow from the source 8 at atmospheric conditions at 2.2 kg/h is started (corresponding to ca. 3.4 kg/h/kg sorbent) feeding adsorber structure 1 with fresh steam, the outlet of which is directed to the condenser by the valve 6 through the conduit 4. As in the previous examples a first air ejection is seen in the step b1' corresponding to the air ejection from the adsorber structure 1.

The step b2' shows the rise in CO2 concentration and flow from adsorber structure 1 as measured by the sensors 11 and 10 respectively and is culminated by the peak in flow as shown previously in Example 1. Step b3' continues as the adsorber structure 1 is purged with steam. At 7.5 minutes in the phase b3'+b1"+b2", valves 6 and 7 are shifted to allow gasses exiting adsorber structure 1 to flow into adsorber structure 2. The resulting air ejection from adsorber structure 2 (b1") is seen in the immediate reduction of CO2 quality and the short flow peak. The adsorber structure 1 is in this phase experiencing purging (b3') by steam with some CO2 desorption and the steam and CO2 pass leaving 1 pass on to adsorber structure 2 where the condensation of the former and adsorption of the latter on the cold sorbent result in a rapid temperature rise coupled with a sharp rise in CO2 concentration (b2") and flow and subsequently a rapid desorption of adsorber structure 2. Further as steam is fed through both adsorber structures in a purging function, the step b3'+b3" which ends with the completion of desorption of adsorber structure 1. The passage of used purge steam with some CO2 onto another heating and purging adsorber structure is the essence of the heat recovery methods of this invention.

Finally in step b3", the valves are again shifted to deliver fresh steam uniquely to adsorber structure 2 which is thereby purged to complete its desorption. Ideally, any number of further adsorber structure can be coupled in this fashion to utilize the purge steam which passes through the adsorber structures to accomplish the heat up step b2 and some part of the purge step b3. Therefore, the only fresh steam delivery to a desorbing adsorber structure would be in its purge step i.e. b2".

Looking at the SR for the adsorber structure 2, one can consider the fresh steam demand for its desorption. The integrated flow of CO2 between 7.5 and 16.5 min yields a molar amount of 0.64 mol however fresh steam was only applied to unit 2 between 12 and 16.5 min at a flow rate of 2.2 kg/h.

The corresponding SR for the unit 2 therefore is 15.6 which is significantly less than cumulative steam ratio at the end of desorption for a single desorbing unit as previously shown in Example 4, indicating that ca. 45% of the heat of desorption can be saved by applying the herein explained and demonstrated novel heat recovery method.

Figure 5A:
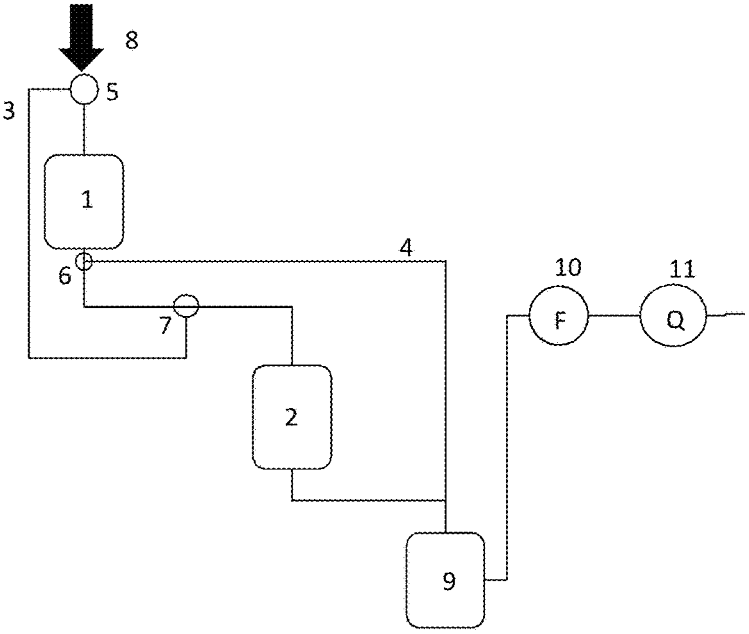
FIG. 5*a*-5*c* shows a schematic with two adsorber structures which can be connected in series in FIG. 5*a*, as well as the carbon dioxide concentration (dotted line) and the gas flow (dashed line) as a function of the desorption time in such a setup in FIG. 5*b*, and in FIG. 5*c* a corresponding set up in which the benefits of interconnected steam treatment is travelling through a series of adsorber structures to bring the benefit in each case.
Figure 5B:
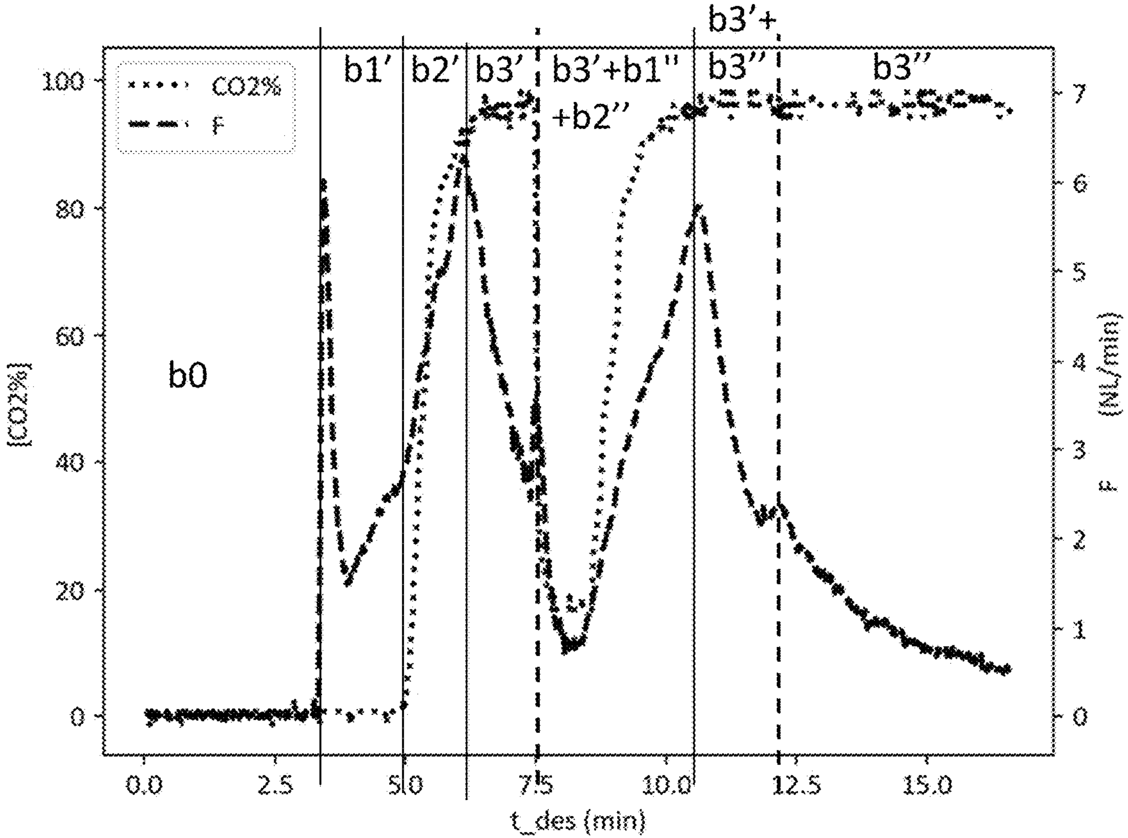
Figure 5C:
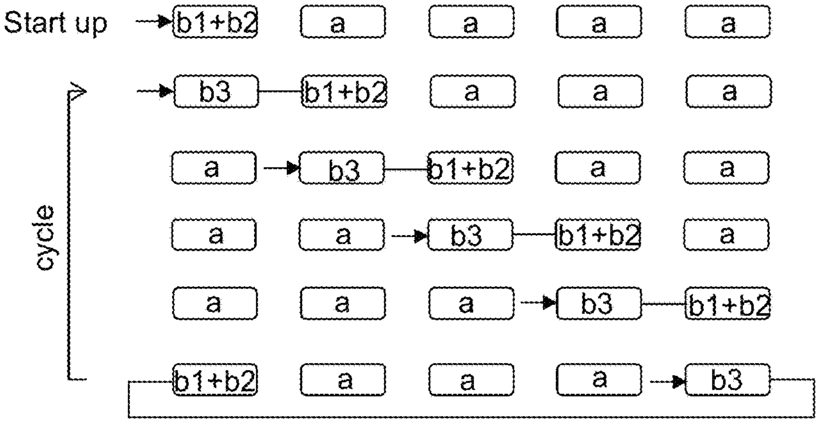

This heat recovery method can be implemented in a cyclic manner for a set of adsorber structures as schematically illustrated in FIG. 5*c*), wherein each rectangle is representing an adsorber structure undergoing a sequence of adsorption step a, air ejection step b1 and heat up step b2, and purge step b3 with an arrow representing the supply of fresh steam and a line connecting adsorber structures an interconnection for steam between adsorber structures.

Each line represents a point in time for five adsorber structures. The only adsorber structure which must be desorbed without utilizing heat recovery is therefore the very first one in the first line i.e. at the start up of operation of the plant.

After that start-up step, the other steps given in the second to sixth line in the figure are cycled as many times as the process is running. Whenever b1+b2 is indicated, this step may also, as illustrated in the context of FIG. 5*b*, include a first fraction of step b3 of the upstream adsorber structure, and wherever b3 is illustrated, this state may also, as illustrated in the context of FIG. 5*b*, include a remaining final fraction of step b3 of the upstream adsorber structure. The number of adsorber structures which are at a time in the adsorption phase (illustrated with (a) can be adapted to the timing or rather the ratio of adsorption to desorption in the corresponding process. If for example the timing of adsorption to desorption is 3:1, ideally a set of 8 adsorber structures is run according to this concept, 6 adsorber structures being at each moment in time in adsorption and two adsorber structures at each moment in time in desorption.

Using such a cyclic process, the benefits of interconnected steam pushing are available to each adsorber structure in the cyclic process at one moment in time realizing this heat recovery method on a plant scale.

Example 6: DAC Adsorption Structure for Usage with High-Speed Steam Atmospheric Steam Desorption In this example an adsorber structure of the prior art is applied to high-speed steam desorption. The large flow through areas of typical DAC adsorber structures are desired to reduce the pressure drop of air flows during adsorption.

For example, one structure of the prior art (e.g. according to WO-A-2014170184 or according to WO-A-2018083109) is shown to have a flow cross section of 35 m2 for a contained sorbent mass of 400 kg distributed in a plurality of sorbent material layers operating at 15,000 Nm3/h air flow and producing therefore an air speed flow of 0.12 m/s.

If the same flow through area is applied to a steam flow for the desorption method of this invention with an energetically advantageous specific steam flow rate of 2 kg/h/kg sorbent, the resulting steam speed through the adsorber structure is 0.01 m/s.

Conversely, by flowing the steam flow through the cross-sectional area of the footprint of the adsorber structure (ca. 1.5×1m), the flow speed can be increased to 0.25 m/s and falls well within the desired range of 0.5 to 4 times the adsorption flow speed.

Correspondingly, the steam passes through all sorbent material layers sequentially producing a pressure drop of just over 60 mbar once the full flow is passing through the absorber structure. Were the prior art disclosures to apply such steam velocities to their proposed desorption processes, they would need to apply vastly higher specific steam flow rates producing a high thermal energy demand.

As comparison, producing a steam flow speed of 0.25 m/s with a steam flow path equivalent to the air-flow path would require a steam usage of nearly 50 kg/h/kg sorbent (29 MW thermal) which in terms of energy and piping infrastructure for distribution is prohibitive for the large-scale systems required for effective DAC implementation.

Further still, were the timing to be only 4 min of desorption—the shortest demonstrated experimentally at this steam flow speed V_s—and assuming the highest determined cyclic capacity of 0.95 mmol/g, the steam demand in this unfavourable configuration would be a dramatic 195 mol H2O/mol CO2.

The range steam flow speed V_s defined in this invention is largely based on the pressure drop of the steam flow through adsorber structures of the prior art suitable for DAC. With the 0.25 m/s herein determined, 33 sorbent material layers of 20 mm thickness as may be found in the prior art, the resulting pressure drop of the steam is found to be 99 mbar which falls just at the defined pressure limit. Using the steam flow speed V_s of for example 1.5 m/s, yields a pressure drop of the steam 594 mbar in the same adsorber structure which requires either a steam pressure of ca. 1.6 bar (a) at the inlet of the adsorber structure or a vacuum pressure of −0.6 (g) to provide atmospheric steam. The former solution presents structural challenges for DAC devices of the prior art which must hold such overpressures and be considered pressure vessels. Further, higher saturation steam pressures will produce amine sorbent damaging temperatures. The latter solution negates the benefits of atmospheric steam desorption as it requires a vacuum pump to generate the underpressure at the outlet of the adsorber structure. Thereby there arise practical limitations to the steam flow speed V_s which should be obeyed.

LIST OF REFERENCE SIGNS

| | | | |
|---|---|---|---|
| 1 | first adsorber structure unit | 6 | switching/distribution valve |
| 2 | second adsorber structure unit | 7 | switching/distribution valve |
| | | 8 | fresh steam |
| 3 | bypass line for steam to second adsorber structure | 9 | compressor |
| | | 10 | gas flow sensor |
| 4 | bypass line from first adsorber structure to compressor | 11 | carbon dioxide concentration sensor |
| | | F | flow |
| 5 | switching/distribution valve | m H2O | mass of water |
| q_des | desorption capacity | T air out | outlet air temperature |
| SR | steam ratio | t_cool | cooling duration |
| t_des | desorption duration | V_s | steam flow speed |
| Ts | sorbent material temperature | V_aa | ambient air flow speed |

The invention claimed is:

1. A method for separating gaseous carbon dioxide from a gas mixture, containing said gaseous carbon dioxide as well as further gases different from gaseous carbon dioxide by cyclic adsorption/desorption processes, comprising:

providing a sorbent material capable of adsorbing said gaseous carbon dioxide, providing a container containing an adsorber structure with said sorbent material, the adsorber structure being heatable to a temperature of at least 60° C. for the desorption of at least said gaseous carbon dioxide and the container being openable to flow-through of the gas mixture and for contacting the gas mixture with the sorbent material for adsorption, wherein the method comprises the following sequential and in this sequence repeating steps:

(a) contacting said gas mixture with the sorbent material to allow at least said gaseous carbon dioxide to adsorb on the sorbent material under ambient atmospheric pressure and ambient atmospheric temperature in an adsorption step, using a speed of an adsorption gas flow;

(b0) isolating said sorbent material with adsorbed carbon dioxide in said container from flow-through of the gas mixture while maintaining the temperature in the sorbent material;

(b1) injecting a stream of saturated steam essentially at ambient atmospheric pressure and thereby inducing an increase of the temperature of the sorbent material from ambient atmospheric temperature to a temperature between 60and 110° C. while pushing out air contained in the container while not yet directing an outflow of said container to product collection, (b2-b3) extracting at least the desorbed gaseous carbon dioxide from the container and separating gaseous carbon dioxide from water, including by condensation, in or downstream of the container, while still injecting and/or circulating saturated steam at ambient atmospheric pressure into said container, thereby flushing and purging both steam and CO2 from the container;

(c) bringing the sorbent material to ambient atmospheric temperature;

wherein the speed of steam flow through the unit container in step (b1) and/or on average in steps (b1)-(b3) is in the range of 0.5-10 times the speed of the adsorption gas flow in step (a), wherein step (c) is carried out exclusively by contacting said gas mixture with the sorbent material under ambient atmospheric pressure and ambient atmospheric temperature to evaporate and carry away water in the container and to bring the sorbent material to ambient atmospheric temperature.

2. The method according to claim 1, wherein the speed of steam flow through the container in step (b1) and/or on average in steps (b1)-(b3) is in the range of 1-6 times, of the speed of the adsorption gas flow in step (a).

3. The method according to claim 1, wherein the speed of steam flow through the container in step (b1) and/or on average in steps (b1)-(b3) is in the range of 0.1-2m/s.

4. The method according to claim 1, wherein a ratio of a total cumulative fresh steam in steps (b1)-(b3) to the released extracted carbon dioxide is smaller than 40:1.

5. The method according to claim 1, wherein the duration of steps (b1)-(b3), or of steps (b0)-(b3), is less than 15 minutes.

6. The method according to claim 1, wherein a pressure within the container in at least one, or in all of steps (b0)-(b3) is in the range of less than +/−100 mbar (g), of the local ambient atmospheric pressure.

7. The method according to claim 1, wherein the flow of steam and desorbed gaseous carbon dioxide exiting the container in at least one of steps (b1)-(b3) is not directly fed to a steam or water/carbon dioxide separation device including a condenser, but is first passed through at least one further container containing a further adsorber structure with said sorbent material, the further adsorber structure being heatable to a temperature of at least 60° C. for the desorption of at least said gaseous carbon dioxide and the at least one further container being openable to flow-through of the gas mixture and for contacting the gas mixture with the sorbent material for an adsorption step.

8. The method according to claim 1 using at least two containers, or at least 4 or at least 6 or at least 8 containers each containing a respective adsorber structure with sorbent material, each adsorber structure being heatable to a temperature of at least 60° C. for the desorption of at least said gaseous carbon dioxide and each container being openable to flow-through of the gas mixture and for contacting the gas mixture with the sorbent material for an adsorption step, wherein the operation of the containers is synchronised in that there is at least one step for each container in one cycle of the set of containers, wherein a flow of steam and desorbed gaseous carbon dioxide exiting a first one of the containers in at least one of steps (b1)-(b3) is not directly fed to a steam or water/carbon dioxide separation device including a condenser but is first passed through at least one further container downstream of said first one of the containers.

9. The method according to claim 1, wherein the speed of steam flow through the container in step (b1) and/or on average in steps (b1)-(b3) is in the range of 2-4 times of the speed of the adsorption gas flow in step (a).

10. The method according to claim 1, wherein the speed of steam flow through the container in step (b1) or on average in steps (b1)-(b3) is in the range of 0.2-0.4 m/s.

11. The method according to claim 1, wherein the gas mixture in step (a) flows along a gas flow path having a cross-section, and the injected steam flows along a different gas flow path, and the cross-section of the gas flow path in step (a) is larger than the gas flow path of the steam in steps (b1)-(b3) through said container, namely 50 times larger than the gas flow path of the steam in steps (b1)-(b3) through said container.

12. The method according to claim 1, wherein the specific steam flow rate of a desorption process in steps (b1)-(b3) is constant, and in the range of 1-10 kg/h/kg sorbent material, or less than 5 kg/h/kg sorbent material.

13. The method according to claim 1, wherein a ratio of a total cumulative fresh steam in steps (b1)-(b3) to the released extracted carbon dioxide is smaller than 20:1.

14. The method according to claim 1, wherein the extraction of carbon dioxide is started when the carbon dioxide concentration at an outlet of a condenser, is above 30%, or the extraction of carbon dioxide is stopped when the carbon dioxide flow at the outlet of the condenser, is below 0.6 or 0.5 l/min/kg sorbent material.

15. The method according to claim 1, wherein the pressure within the container in at least one, or in all of steps (b0)-(b3) is in the range of less than +/−50 mbar (g) of the local ambient atmospheric pressure.

16. A device for carrying out the method according to claim 1, said device comprising a steam source; and at least one device for the separation of gaseous carbon dioxide from water, wherein at a gas outlet side of said at least one device for separating carbon dioxide from water, there is one or both of a carbon dioxide concentration sensor and a gas flow sensor for controlling the desorption process.

17. The device according to claim 16, said device comprising a steam source;

the at least one container containing an adsorber structure with said sorbent material, the adsorber structure being heatable to a temperature of at least 60° C. for the desorption of at least said gaseous carbon dioxide and the container being openable to flow-through of the gas mixture and for contacting it-the gas mixture with the sorbent material for the adsorption step;

at least one condenser, for separating carbon dioxide from water, wherein at a gas outlet side of said at least one condenser, there is at least one of, or both of a carbon dioxide concentration sensor and a gas flow sensor for controlling the desorption process.

18. A method for separating gaseous carbon dioxide from a gas mixture, containing said gaseous carbon dioxide as well as further gases different from gaseous carbon dioxide by cyclic adsorption/desorption processes, comprising:

providing a sorbent material capable of adsorbing said gaseous carbon dioxide, providing a container containing an adsorber structure with said sorbent material, the adsorber structure being heatable to a temperature of at least 60° C. for the desorption of at least said gaseous carbon dioxide and the container being openable to flow-through of the gas mixture and for contacting the gas mixture it with the sorbent material for adsorption, wherein the method comprises the following sequential and in this sequence repeating steps:

(a) contacting said gas mixture with the sorbent material to allow at least said gaseous carbon dioxide to adsorb on the sorbent material under ambient atmospheric pressure and ambient atmospheric temperature in an adsorption step, using a speed of an adsorption gas flow;

(b0) isolating said sorbent material with adsorbed carbon dioxide in said container from flow-through of the gas mixture while maintaining the temperature in the sorbent material;

(b1) injecting a stream of saturated steam essentially at ambient atmospheric pressure and thereby inducing an increase of the temperature of the sorbent material from ambient atmospheric temperature to a temperature between 60 and 110° C. while pushing out air contained in the container while not yet directing an outflow of said container to product collection, (b2-b3) extracting at least the desorbed gaseous carbon dioxide from the container and separating gaseous carbon dioxide from water, including by condensation, in or downstream of the container, while still injecting and/or circulating saturated steam at ambient atmospheric pressure into said container, thereby flushing and purging both steam and CO2 from the container;

(c) bringing the sorbent material to ambient atmospheric temperature;

wherein the speed of steam flow through the container in step (b1) and/or on average in steps (b1)-(b3) is in the range of 0.5-10 times the speed of the adsorption gas flow in step (a), wherein the gas flow mixture in step (a) flows along a gas flow path having a cross-section, and the injected steam flows along a different gas flow path in steps (b1)-(b3), and the cross-section of the gas flow path of the gas mixture in step (a) is larger than the gas flow path of the steam through said container by a factor of 1.5;

or wherein the gas flow mixture in step (a) flows along a gas flow path having a cross-section, and the injected steam flows along a different gas flow path in steps (b1)-(b3) through said container.

19. The method according to claim 18, wherein the gas flow path of the gas mixture in step (a) is on average along a first direction, and the gas flow path of the steam in steps (b1)-(b3) is on average along a second direction.

20. The method according to claim 19, wherein the first and second directions are essentially orthogonal.

21. A method for separating gaseous carbon dioxide from a gas mixture, containing said gaseous carbon dioxide as well as further gases different from gaseous carbon dioxide by cyclic adsorption/desorption processes, comprising:

providing a sorbent material capable of adsorbing said gaseous carbon dioxide, providing a container containing an adsorber structure with said sorbent material, the adsorber structure being heatable to a temperature of at least 60° C. for the desorption of at least said gaseous carbon dioxide and the container being openable to flow-through of the gas mixture and for contacting the gas mixture with the sorbent material for adsorption, wherein the method comprises the following sequential and in this sequence repeating steps:

(a) contacting said gas mixture with the sorbent material to allow at least said gaseous carbon dioxide to adsorb on the sorbent material under ambient atmospheric pressure and ambient atmospheric temperature in an adsorption step, using a speed of an adsorption gas flow;

(b0) isolating said sorbent material with adsorbed carbon dioxide in said container from flow-through of the gas mixture while maintaining the temperature in the sorbent material;

(b1) injecting a stream of saturated steam essentially at ambient atmospheric pressure and thereby inducing an increase of the temperature of the sorbent material from ambient atmospheric temperature to a temperature between 60 and 110° C. while pushing out air contained in the container while not yet directing an outflow of said container to product collection, (b2-b3) extracting at least the desorbed gaseous carbon dioxide from the container and separating gaseous carbon dioxide from water, including by condensation, in or downstream of the container, while still injecting and/or circulating saturated steam at ambient atmospheric pressure into said container, thereby flushing and purging both steam and CO2 from the container;

(c) bringing the sorbent material to ambient atmospheric temperature;

wherein the speed of steam flow through the container in step (b1) and/or on average in steps (b1)-(b3) is in the range of 0.5-10 times the speed of the adsorption gas flow in step (a), wherein the specific steam flow rate of the desorption process in steps (b1)-(b3) is constant.

22. A method for separating gaseous carbon dioxide from a gas mixture, containing said gaseous carbon dioxide as well as further gases different from gaseous carbon dioxide by cyclic adsorption/desorption processes, comprising:

providing a sorbent material capable of adsorbing said gaseous carbon dioxide, providing a container containing an adsorber structure with said sorbent material, the adsorber structure being heatable to a temperature of at least 60° C. for the desorption of at least said gaseous carbon dioxide and the container being openable to flow-through of the gas mixture and for contacting the gas mixture it with the sorbent material for adsorption, wherein the method comprises the following sequential and in this sequence repeating steps:

(a) contacting said gas mixture with the sorbent material to allow at least said gaseous carbon dioxide to adsorb on the sorbent material under ambient atmospheric pressure and ambient atmospheric temperature in an adsorption step, using a speed of an adsorption gas flow;

(b0) isolating said sorbent material with adsorbed carbon dioxide in said container from flow-through of the gas mixture while maintaining the temperature in the sorbent material;

(b1) injecting a stream of saturated steam essentially at ambient atmospheric pressure and thereby inducing an increase of the temperature of the sorbent material from ambient atmospheric temperature to a temperature between 60 and 110° C. while pushing out air contained in the container while not yet directing an outflow of said container to product collection, (b2-b3) extracting at least the desorbed gaseous carbon dioxide from the container and separating gaseous carbon dioxide from water, including by condensation, in or downstream of the container, while still injecting and/or circulating saturated steam at ambient atmospheric pressure into said container, thereby flushing and purging both steam and CO2 from the container;

(c) bringing the sorbent material to ambient atmospheric temperature;

wherein the speed of steam flow through the container in step (b1) and/or on average in steps (b1)-(b3) is in the range of 0.5-10 times the speed of the adsorption gas flow in step (a), wherein the extraction of carbon dioxide is started when the carbon dioxide concentration at an outlet of a separation device is above 20% or the extraction of carbon dioxide is stopped when the carbon dioxide flow at the outlet of the separation device is below 1.2 or 0.7 l/min/kg sorbent material.

23. A method for separating gaseous carbon dioxide from a gas mixture, containing said gaseous carbon dioxide as well as further gases different from gaseous carbon dioxide by cyclic adsorption/desorption processes, comprising:

providing a sorbent material capable of adsorbing said gaseous carbon dioxide, providing a container containing an adsorber structure with said sorbent material, the adsorber structure being heatable to a temperature of at least 60° C. for the desorption of at least said gaseous carbon dioxide and the container being openable to flow-through of the gas mixture and for contacting the gas mixture with the sorbent material for adsorption, wherein the method comprises the following sequential and in this sequence repeating steps:

(a) contacting said gas mixture with the sorbent material to allow at least said gaseous carbon dioxide to adsorb on the sorbent material under ambient atmospheric pressure and ambient atmospheric temperature in an adsorption step, using a speed of an adsorption gas flow;

(b0) isolating said sorbent material with adsorbed carbon dioxide in said container from flow-through of the gas mixture while maintaining the temperature in the sorbent material;

(b1) injecting a stream of saturated steam essentially at ambient atmospheric pressure and thereby inducing an increase of the temperature of the sorbent material from ambient atmospheric temperature to a temperature between 60 and 110° C. while pushing out air contained in the container while not yet directing an outflow of said container to product collection, (b2-b3) extracting at least the desorbed gaseous carbon dioxide from the container and separating gaseous carbon dioxide from water, including by condensation, in or downstream of the container, while still injecting and/or circulating saturated steam at ambient atmospheric pressure into said container, thereby flushing and purging both steam and CO2 from the container;

(c) bringing the sorbent material to ambient atmospheric temperature;

wherein the speed of steam flow through the container in step (b1) and/or on average in steps (b1)-(b3) is in the range of 0.5-10 times the speed of the adsorption gas flow in step (a), wherein the duration of steps (b1)-(b3), or of steps (b0)-(b3), is less than 6 minutes.

24. A method for separating gaseous carbon dioxide from a gas mixture, containing said gaseous carbon dioxide as well as further gases different from gaseous carbon dioxide by cyclic adsorption/desorption processes, comprising:

providing a sorbent material capable of adsorbing said gaseous carbon dioxide, providing a container containing an adsorber structure with said sorbent material, the adsorber structure being heatable to a temperature of at least 60° C. for the desorption of at least said gaseous carbon dioxide and the container being openable to flow-through of the gas mixture and for contacting the gas mixture with the sorbent material for adsorption, wherein the method comprises the following sequential and in this sequence repeating steps:

(a) contacting said gas mixture with the sorbent material to allow at least said gaseous carbon dioxide to adsorb on the sorbent material under ambient atmospheric pressure and ambient atmospheric temperature in an adsorption step, using a speed of an adsorption gas flow;

(b0) isolating said sorbent material with adsorbed carbon dioxide in said container from flow-through of the gas mixture while maintaining the temperature in the sorbent material;

(b1) injecting a stream of saturated steam essentially at ambient atmospheric pressure and thereby inducing an increase of the temperature of the sorbent material from ambient atmospheric temperature to a temperature between 60 and 110° C. while pushing out air contained in the container while not yet directing an outflow of said container to product collection, (b2-b3) extracting at least the desorbed gaseous carbon dioxide from the container and separating gaseous carbon dioxide from water, including by condensation, in or downstream of the container, while still injecting and/or circulating saturated steam at ambient atmospheric pressure into said container, thereby flushing and purging both steam and CO2 from the container;

(c) bringing the sorbent material to ambient atmospheric temperature;

wherein the speed of steam flow through the container in step (b1) and/or on average in steps (b1)-(b3) is in the range of 0.5-10 times the speed of the adsorption gas flow in step (a)

using at least at least 8 containers each containing an adsorber structure with said sorbent material, the adsorber structure being heatable to a temperature of at least 60° C. for the desorption of at least said gaseous carbon dioxide and the containers being openable to flow-through of the gas mixture and for contacting it-the gas mixture with the sorbent material for an adsorption step, wherein the operation of the containers is synchronised in that there is at least one step for each container in one cycle of a set of containers, wherein the flow of steam and desorbate exiting a first one of the containers in at least one of steps (b1)-(b3) is not directly fed to a steam or water/carbon dioxide separation device including a condenser but is first passing at least one further container downstream of said first one of the containers.

* * * * *